G. B. TURNER.
GRAIN SEPARATOR.
No. 189,884. Patented April 24, 1877.
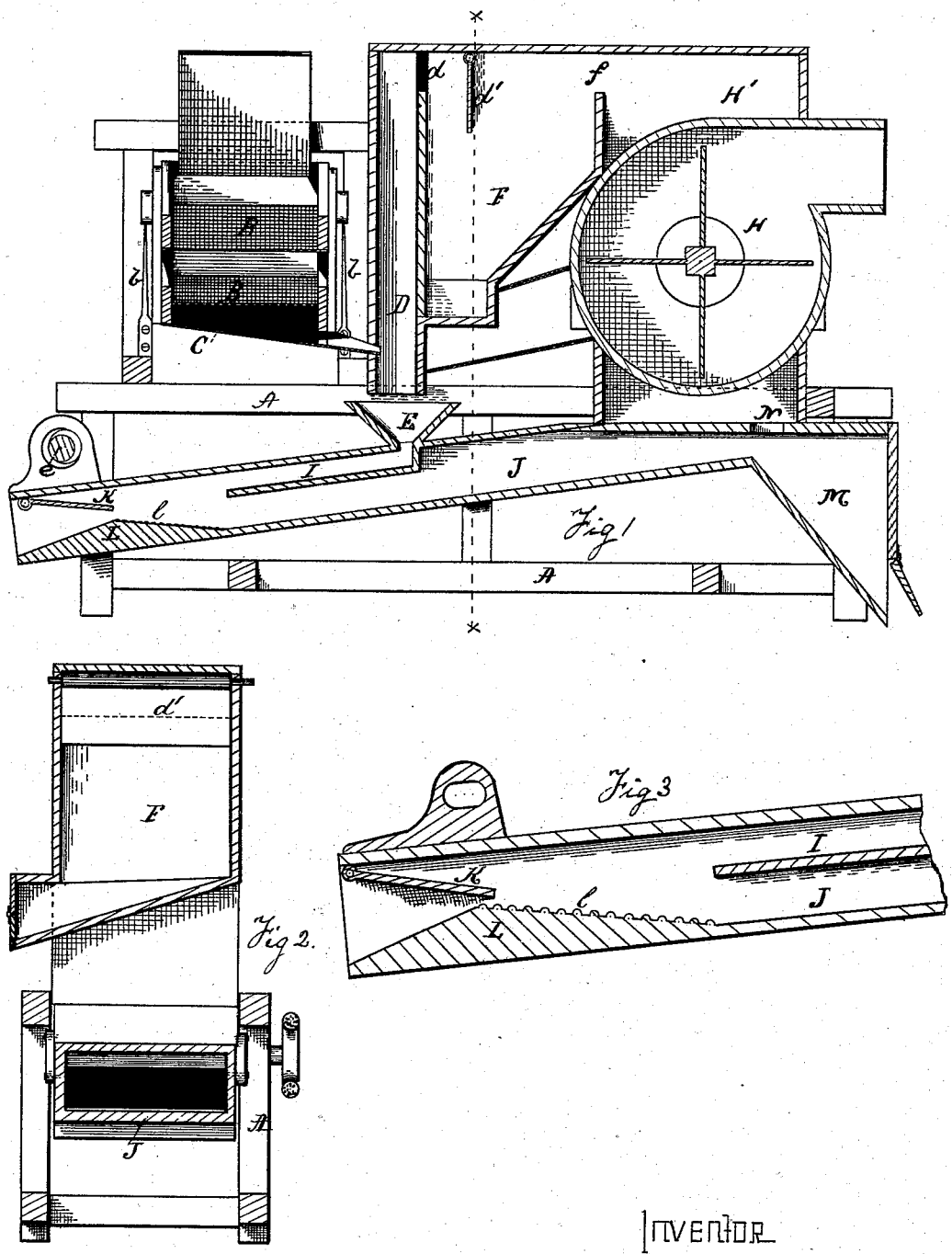

UNITED STATES PATENT OFFICE.

GRANT B. TURNER, OF CUYAHOGA FALLS, OHIO.

IMPROVEMENT IN GRAIN-SEPARATORS.

Specification forming part of Letters Patent No. 189,884, dated April 24, 1877; application filed January 23, 1877.

*To all whom it may concern:*

Be it known that I, GRANT B. TURNER, of Cuyahoga Falls, in the county of Summit, and State of Ohio, have invented a new and useful Improvement in Grain-Separators; and I do hereby declare the following to be a full, clear, and exact description thereof, reference being had to the accompanying drawing, in which—

Figure 1 is a longitudinal vertical section of a separator embodying my invention. Fig. 2 is a transverse vertical section on the line $y\ y$, Fig. 1, and Fig. 3 is a partial sectional view of the shaking-spout.

Like letters refer to like parts wherever they occur.

My invention relates to the construction and operation of grain-separators.

The object of my invention is the separation and removal from the grain of all sticks, straw-joints, rat-balls, light and grown wheat, and garlic, or other light substances that naturally float upon the top of the heavier grain, and yet are of sufficient gravity to pass the riddles and blast of separators as at present generally constructed.

I will now proceed to describe my invention so that others skilled in the art to which it appertains may apply the same.

In the drawing, A represents the main frame, which will be of suitable form and size to support the operative parts of the machine. On one end of the main frame A are arranged a series of riddles, B B, of any approved form and construction, having directing-boards, and a shoe, C, which delivers the grain to a spout, D. These riddles are preferably supported on springs $b$, and operated by a pitman, (not shown,) common to the riddles and shaking-spout, whereby a balance motion is obtained, found in practice to be advantageous. D indicates a spout communicating above by means of passage $d$ with a hopper, F, which in turn communicates through passage $f$ with the fan-chamber H′. The passage $d$, between the hopper and spout, is usually guarded by a gate or valve, $d'$, which both controls the area of the passage and serves as a deflector to facilitate the deposition in hopper F of the heavy screenings carried over in the blast. Within the fan-chamber H′ is arranged the usual or any approved fan H, and the sides of the fan-chamber have the common ports for regulating the blast.

To the extent thus far described the devices are, or may be, such as are in common use. With such or a similar separator, I combine a long shaking-spout, J, inclined or set at an angle, as shown, and supported upon springs or equivalent devices, so as to be capable of vibrating longitudinally in the frame A. This shaking-spout receives its motion from a cam upon the shaft, and may, through pitman, communicate motion to the riddles B. The shaking-spout J terminates at one end in a hopper, $m$, for the reception of light material carried off by the blast. It is also connected by the passage $n$ with the fan-chamber H′, and has upon its upper surface, at a point below the open end of spout D, a hopper or like device, E, for receiving the grain from the separator and directing it into the shaking-spout.

Within the shaking-spout J, under the opening of hopper E, is a deflecting shelf, I, preferably arranged an inch or two below the top of the spout, to receive the grain as it enters the spout and conduct it to the rear of the "hog-back," so that it shall fall upon a body of grain retained in spout J, rather than directly into the spout. L represents what I term the "hog-back." It is a rise of three or four inches in the forward part of the shaking-spout, near its delivery-end, formed by a double incline, and has for its object to form a basin and retard the discharge of the grain, so that a mass or body of the grain will be always retained in the shaking-spout, and in order to control the force with which the blast impinges on the surface of the grain retained in the spout J, I arrange a valve, K, within the forward part of the spout, so as to work over or near the apex of the inclines forming the hog-back. By raising or lowering the valve K the blast will be brought with more or less force upon the surface of the grain in the spout, and particularly so at the apex of the hog-back, so as to sweep back the light or float matter and prevent its discharge with the grain.

In practice it frequently happens that the grain will be discharged from the spout J over the hog-back faster than is desirable, or before it is thoroughly free from light material, and in order to correct this difficulty I roughen the inner incline, as shown at *l*, Fig. 3. This roughening of the incline is also a material matter, as it insures a thorough agitation of the grain retained in the basin formed by the hog-back.

It will be observed that my invention is shown in connection with a separator adapted for a suction-blast, because in practice I find the suction-blast gives the best results.

The operation of my devices is as follows: The fan being set in motion and the usual suction-blast obtained, the grain is fed upon the riddles, which separate the coarser sticks, straws, &c., and permit the grain to fall into the shoe, which delivers it into the spout D. In spout D it meets the blast, through which the heavy grain falls while the lighter heavy screenings are carried over in the blast, being deposited in hopper F, the dust, &c., passing through the fan-chamber into the fan.

This is the extent of the operation of the ordinary grain-separators, the heavy grain discharged at D being considered as cleaned up. In my machine the grain discharged from spout D falls into hopper E, and is directed into spout J, falls upon shelf I, which discharges it upon the body of grain back of the hog-back F. The vibratory motion of spout J causes the separation of any stick, straw-joints, and garlic, &c., from the grain, the latter sinking into the basin formed by the inclines, while the light material rises to the surface and is swept off by the blast passing through the spout in the direction of the fan, the straw-joints, sticks, &c., being deposited in hopper M while the blast enters the fan at N.

These devices will be found to operate well on hominy and large heavy middlings, and, in fact, on any similar material where there are substances to be removed lighter than the material to be cleaned, and which will float on the top of the heavier grain.

It is evident that the shaking-spout and a fan, or equivalent device, for producing an air-blast through the spout and over the grain, middlings, or like material descending the spout, will, in itself, form an effective and simple separator, equal to any, and superior to many, grain and middlings separators now in use.

Having thus described my invention, what I claim, and desire to secure by Letters Patent is—

1. The inclined shaking-spout, having the transverse roughened incline or hog-back, in combination with a fan for inducing an air-current through the spout, substantially as specified.

2. In combination with a grain-separator the vibrating or shaking spout having the transverse incline or hog-back, and means for inducing an air-blast through the same, all substantially as and for the purpose specified.

3. In combination with the shaking-spout the transverse inclines or hog-back, substantially as and for the purpose specified.

4. In combination with the shaking-spout the incline or hog-back and the valve located over the hog-back, substantially as and for the purpose specified.

5. In combination with the shaking-spout the incline or hog-back, and the receiving and deflecting shelf, substantially as and for the purpose specified.

6. The inclined shaking-spout, having the hopper M, in combination with a fan for inducing an air-blast through the spout, substantially as and for the purpose specified.

In testimony whereof I, the said GRANT B. TURNER, have hereunto set my hand.

GRANT B. TURNER.

Witnesses:
JAMES I. KAY,
F. W. RITTER, Jr.